(12) United States Patent
Stevens (10) Patent No.: US 6,874,088 B1
(45) Date of Patent: Mar. 29, 2005

(54) SECURE REMOTE SERVICING OF A COMPUTER SYSTEM OVER A COMPUTER NETWORK

(75) Inventor: Brian Stevens, New Boston, NH (US)

(73) Assignee: Mission Critical Linux, LLC, Lowell, MA (US)

( * ) Notice: Subject to any disclaimer, the term of this patent is extended or adjusted under 35 U.S.C. 154(b) by 992 days.

(21) Appl. No.: 09/594,654

(22) Filed: Jun. 15, 2000

Related U.S. Application Data (60) Provisional application No. 60/160,985, filed on Oct. 22, 1999.

(51) Int. Cl.[7] .......................... H04L 9/00; G06F 15/16; H04K 1/00
(52) U.S. Cl. ...................... 713/201; 713/153; 713/169; 709/203; 709/217; 709/237; 380/229; 380/232; 380/247
(58) Field of Search ............................... 713/153, 161, 713/169, 201, 202; 709/203, 217, 236, 237, 224; 380/229, 232, 247

(56) References Cited

U.S. PATENT DOCUMENTS

| | | | | |
|---|---|---|---|---|
| 6,070,190 A | * | 5/2000 | Reps et al. | 709/224 |
| 6,085,227 A | * | 7/2000 | Edlund et al. | 709/203 |
| 6,286,104 B1 | * | 9/2001 | Buhle et al. | 713/201 |
| 6,467,088 B1 | * | 10/2002 | alSafadi et al. | 717/173 |
| 2003/0037160 A1 | * | 2/2003 | Wall et al. | 709/233 |

* cited by examiner

Primary Examiner—Thomas R. Peeso
Assistant Examiner—A. Nobahar
(74) Attorney, Agent, or Firm—Weingarten, Schurgin, Gagnebin & Lebovici LLP (57) ABSTRACT

The remote servicing of a secure computer system employs an intermediate network entity accessible to both a remote service provider and to an agent running on the secure computer system to be serviced. A service provider's computer runs a manager software module, while the system being serviced, or an agent on its behalf, runs an agent software module. An intermediary software module runs on the intermediate network entity. The mutually accessible intermediate network entity may be located outside firewalls protecting the system to be serviced or inside such firewalls though with the firewalls configured to allow selected access. Access to the intermediate network entity is limited by secure access protocols. After authentication, the manager submits to the intermediary one or more directives to be executed by the agent. The intermediary then sends the directives to the agent over a secure connection to the agent. The agent then executes the directive(s) upon receipt and sends the response to the intermediary via the secure connection. The manager is then capable of accessing the results via the intermediary.

23 Claims, 5 Drawing Sheets

SECURE REMOTE SERVICING OF A COMPUTER SYSTEM OVER A COMPUTER NETWORK

CROSS REFERENCE TO RELATED APPLICATIONS

This application claims priority of U.S. Provisional Patent Application No. 60/160,985, filed Oct. 22, 1999, the disclosure of which is hereby incorporated by reference.

STATEMENT REGARDING FEDERALLY SPONSORED RESEARCH OR DEVELOPMENT

N/A

BACKGROUND OF THE INVENTION

This invention relates to the servicing of computer systems, and more specifically to the secure servicing of remote computer systems and network appliances.

The servicing of computer systems encompasses the processes and methods by which the proper operation and maintenance of computer systems are ensured. Servicing can be used to detect and correct problems prior to serious failures, or to restore computer system operation when the proper functioning of the system has been compromised.

With an ever expanding use of computer systems in the commercial sector, many businesses find outsourcing the servicing of their computing investments a cost effective alternative to maintaining and managing an internal support staff. However, implicit in the contracting of third party support has been the cost of support personnel travelling to the contracting party's site to perform such servicing. Further, there is often a delay in the provision of such service, particularly when the contracting party is located in a location remote from significant centers of commerce. While it may be possible for a contracting party to request expedited on-site support when needed, such a request typically comes at an increased cost.

The wide scale use of computer networks such as the Internet has not yet been leveraged as an effective tool for the servicing of computer systems. Today, the Internet's role is relegated to being the conduit by which problem reports are entered and tracked by system administrators. In most cases, such problem reports provide only the symptoms or consequences of a problem; service professionals must still obtain additional information in order to provide an effective resolution. Access to this additional information typically occurs in one of three ways: over the phone with remote service professionals instructing system administrators with commands to run various directives and to report verbally on their outcome; through email exchanges between the service professional and the system administrator; or by on-site staffing or visitation by service professionals. The former two have historically provided a slow problem resolution time due to the need for information to pass through an intermediary, the system administrator. The information relayed to the service personnel may also be incomplete or improperly characterized. The latter approach clearly enables rapid resolution, but can be significantly more expensive than the other methods.

It would therefore be preferable to enable a system for supporting secure computer networks that combines the beneficial aspects of these prior art approaches. Specifically, such a support system would preferably have the following three characteristics.

First, the system must be interactive, such that the service professional is capable of directly interrogating or commanding the computer system to be maintained and of receiving a direct, substantially immediate response. The service professional should have the ability to download patches and make changes to the target system in order to restore compromised function as rapidly as possible.

Second, this interactive access to the target system must be capable of being provided remotely in order to obviate the need for as-needed or permanent on-site support. The service professional must have the ability to access the system being serviced from any location having access to the Internet or other appropriately configured data network.

Third, the facility for providing service personnel with remote access must be secure. Only authorized service personnel should have access to the target computer system. Further, all data exchanges between the service personnel and the target system should be encrypted to prevent electronic eavesdropping or "snooping" by third parties. Encryption also serves to frustrate attempts by third parties to inject false directives to the target system or to submit false data to the service personnel.

The Internet provides the communications vehicle by which businesses all over the world are connected. Layered protocols such as Hypertext Transport Protocol (HTTP) support interactive exchanges over the Internet. It is necessary for businesses to tightly control which, if any, parts of their internal computer networks are accessible to computer users outside such internal networks. This is often accomplished through the use of firewall technology segment an enterprise's networks such that internal networks are not accessible to unauthorized personnel including users of other networks such as the Internet. To this end, firewalls examine data packet identifiers in deciding which are allowed to pass the boundary between internal and external networks.

However, necessary security provisions including firewalls represent an obstacle to realizing a secure, remote network support system. For instance, an attempt to send a request other than a mail message to a firewall-protected network will normally fail. The only systems which are accessible by external access are corporate web servers which are often resident outside the firewall.

The most common remote management solution in use at present is Secure Shell (SSH) which allows encrypted, remote login over the Internet. The system allowing remote login must manage all access control; improper configuration of such a system could expose the protected systems to a security risk. In addition, firewalls between the Internet and a system to be supported must be configured to allow a port specific to SSH to be passed through, which some administrators are reluctant to do.

BRIEF SUMMARY OF THE INVENTION

The presently disclosed remote servicing of a secure computer system employs an intermediate network entity accessible to both a remote service provider and to an agent running on the target computer system to be serviced. Such servicing may be referred to as Secure Servicing Technology (SST).

A service professional's computer runs a Service Manager (SM) software module, while the system being managed or serviced runs a Secure Service Agent (SSA) software module.

A Secure Service Intermediary (SSI) software module runs on the intermediate network entity such as a computer system accessible to both the SM and the SSA. This mutually accessible system may be located outside firewalls protecting the system to be maintained or inside such firewalls configured to allow selected access. In addition, the mutually accessible system is configured with all of the safeguards of computer systems currently supporting e-commerce, including encrypted connections.

Access to the intermediate network entity is limited to access over secure access protocols, and then only after proper authentication and authorization. The SM, using secure access protocols, connects to the SSI, and after authentication authorizes itself to perform directives on the SSA. A directive may be any command or executable which the SM requests to be executed on the SSA. Once so authorized, the SM passes a directive via standard HTTP to a CGI process spawned by the SSI. The CGI establishes whether a secure connection exists between the SSI and the target SSA. If so, the CGI process passes the directive to the SSI, which in turn passes the directive to the SSA using secure access protocols. The SSA then executes the directive. Meanwhile both the SSI and the CGI process block, or enter an idle state, until a valid response is returned from the SSA to the SSI. The SSI passes the response to the CGI, which in turn provides it to the SM for analysis by the service professional.

This flexible architecture has application to a broad range of networked computer systems requiring interactive, secure data exchange over a distributed network such as the Internet.

DETAILED DESCRIPTION OF THE INVENTION

The present system 10 for remotely supporting or servicing secure computer systems 14 enables a service professional to maintain a computer system anywhere in the world.

Figure 1:
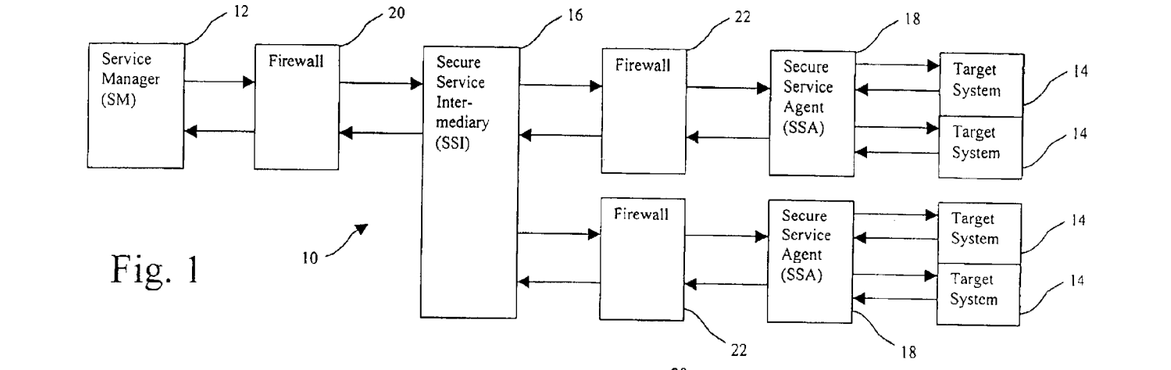
FIG. 1 is a block diagram of one embodiment of a remote support system for a secure computer system according to the present invention.
Figure 2:
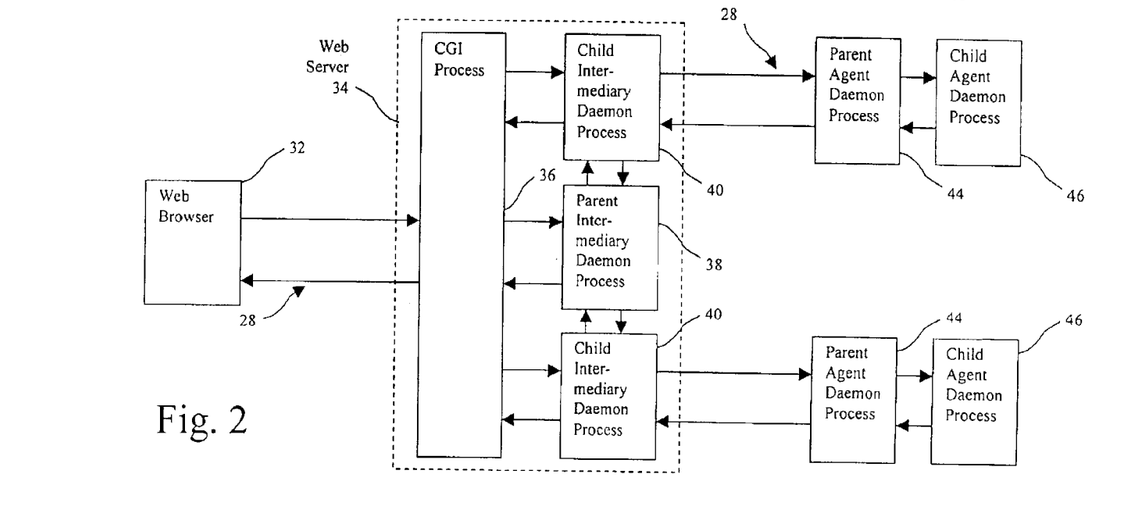
FIG. 2 is a block diagram of one embodiment of software modules which are executed by the secure computer system of FIG. 1.

With reference to FIGS. 1 and 2, the service professional employs a computer system running a service manager (SM) module 12. In a first embodiment, the SM is an Internet browser 32 such as NETSCAPE NAVIGATOR. The service professional employs the SM 12 to send service directives to and to receive the results of executed service directives from a secure service intermediary (SSI) 16. The data pathway between the SM 12 and the SSI 16 is the Internet in a first embodiment, with world-wide interconnectivity enabling remote access for a service professional from practically any location. However, in alternative embodiments, dedicated or limited access computer networks are utilized.

In a first embodiment, the SSI 16 is realized by a web server 34 which supports secure sockets layer (SSL), such as APACHE of Apache Micro Peripherals, Inc. SSL is a protocol developed by Netscape Communications Corporation for transmitting private documents or data via the Internet. SSL works by using a private key to encrypt data that is transferred over the SSL connection.

Much of the functionality of the SSI 16 is implemented in common gateway interfaces (CGI) 36. CGI is a standard for external gateway programs which interface with information servers such as World Wide Web servers. A CGI program is also any program designed to accept and return data that conforms to the CGI specification. The program can be written in any programming language, including C, Perl, Java, or Visual Basic. CGI programs are the most common way for web serves to interact dynamically with users.

The SSI 16 is also comprised of a parent intermediary daemon process 38. A daemon process is a software process that runs in the background and performs a specified operation. This parent intermediary daemon process 38 is responsible for conveying directives received from the SM 12 to the SSA 18, as will be described below. In addition, the parent intermediary daemon process 38 is responsible for conveying results from one or more SSA-executed directives to the appropriate SM 12, as will be discussed in the following.

Service personnel ("the user") can connect to the SSI 16 via the Internet 28 by entering the appropriate universal resource locator (URL) into the SM browser 32. Once connected, the user is requested to enter his or her name and password such that a CGI process 36 of the SSI 16 can authenticate the identity of the user and ensure that the user is an authorized user of the SSI system 16. All network (i.e. Internet) transactions between the SM browser 32 and the SSI web server 34 use SSL encryption for complete protection of passwords and data.

Once authorized, the user selects which secure computer system 14 ("target system") they wish to perform a service management directive on. The user is then presented with a web-based interface that allows them to query and perform actions on the selected system to be supported 14 via a secure service agent (SSA) 18.

The SSA 18 is implemented as a software module capable of executing various commands or executables on the target system(s) to be serviced 14. In a preferred embodiment, the SSA 18 is implemented as a parent agent daemon process 44. When the SSA 18 is initiated, the parent agent daemon process 44 establishes a secure connection to the SSI 16 parent intermediary daemon process 38.

When a directive for execution by one of the target systems 14 has been received over this secure connection, the parent agent daemon process 44 spawns a respective child agent daemon process 46. This child agent daemon process 46 carries out the execution of the directive and returns any results to the parent agent daemon process 44. These daemon programs 44, 46 are written in the C programming language in a first embodiment.

As the user selects a service or maintenance operation, a CGI program 36 on the SSI 16 determines whether a valid, secure connection has been established between an child intermediary daemon process 40 and the parent agent daemon process 44. If such a connection exists, the SSI CGI process 36 makes a connection to the this child intermediary daemon process 38 and passes the directive received from the SM 12 to this child intermediary daemon process 40. The child intermediary daemon process 40 receives the directive and sends it over the secure connection to the parent agent daemon process 44 on the SSA 18. Having transferred the directive to the SSA 18, both the CGI process 36 and the child intermediary daemon process 40 block, or enter an idle state, pending receipt of results from the execution of the directive by the target system 14.

Meanwhile, if the user issues another directive to the SSI 16, the SSI 16 spawns a new CGI process 36 to receive the directive. The new directive is then transferred by this new CGI process 36 to the child intermediary daemon process 40 which is already in communication with the respective SSA 18 processes. This child intermediary daemon process 40 then forwards the new directive to the parent agent daemon process 44, which in turn spawns a new child agent daemon process 46 for executing the directive on the target system and which returns the results in the same fashion as previously described. Thus, several users and/or directives can be passed to the SSI 16 and on to the SSA 18 at the same time. A single connection between the SSI 16 child intermediary daemon process 40 and the parent agent daemon process 44 is capable of supporting multiple users and/or simultaneous directives.

Once a parent agent daemon process 44 on an SSA 18 associated with a target system to be maintained 14 is started or initiated and the communications channel with the respective child intermediary daemon 40 process has been established, the parent agent daemon process 44 blocks pending receipt of a directive to be executed on one of the target systems 14 associated with that SSA 18. If such a directive is received, the parent agent daemon process 44 spawns a respective child agent daemon process 46 which will remain in communication with the parent agent daemon process 44 until all results from the executed directive have been returned to the SSI 16. Once this occurs, the child agent daemon process 46 exits. Each of these daemon processes 38, 40, 44, 46 block, or remain in an idle state, until they are needed to either receive or send data.

As with the SM browser 32, the connection from the SSA 18 to the SSI 16 uses hypertext transfer protocol (HTTP) over SSL. In a first embodiment, the data network between the SSA 18 and the SSI 16 is the Internet 28, though other networks are employed in further embodiments. HTTP, the underlying protocol used by the World Wide Web, defines how messages are formatted and transmitted, and what actions Web servers and browsers should take in response to various commands. Also as with the SM browser 32, the identity of the SSA 18 is authenticated by the SSI 16 parent intermediary daemon process 38. A firewall 22 separating the SSI 16 and the systems to be serviced 14 is configured in order to allow selective access to the SSI 16 by the SSA 18. Any attempt to transmit directives from external devices directly to the SSA 18 (other than through the SSI 16 as described above) is prevented.

Once connected to and authenticated by the SSI 16 daemon process at startup, the SSA 18 daemon 44 blocks, and receives directives from and sends results to the SSI 16 daemon process over the valid SSL connection. Once the SSI 16 child intermediary daemon process 40 acknowledges a response from the respective agent process 44, the SSI child intermediary daemon process 40 becomes unblocked. The response from the agent daemon 44 is received by the respective child intermediary daemon process 40, then sent over the valid connection to the SSI CGI process 36, which in turn sends the results to the SM 12 web browser 32 for display to the user.

As noted, all communications between the SM 12, SSI 16 and SSA 18 employ HTTP over SSL. Thus, all data is encrypted end to end, and the SSI is authenticated using digital certificates each time a new SSA 18 makes an initial connection. Additionally, user identity and password information are validated by the SSI 16 with each directive or directive response.

An optional firewall 20 is provided between the SM 12 and the SSI 16. In his embodiment, the firewall 20 is configured to allow selected access by each of the SM 12 to the SSI 16 according to methods known to one skilled in the art.

Figure 3:
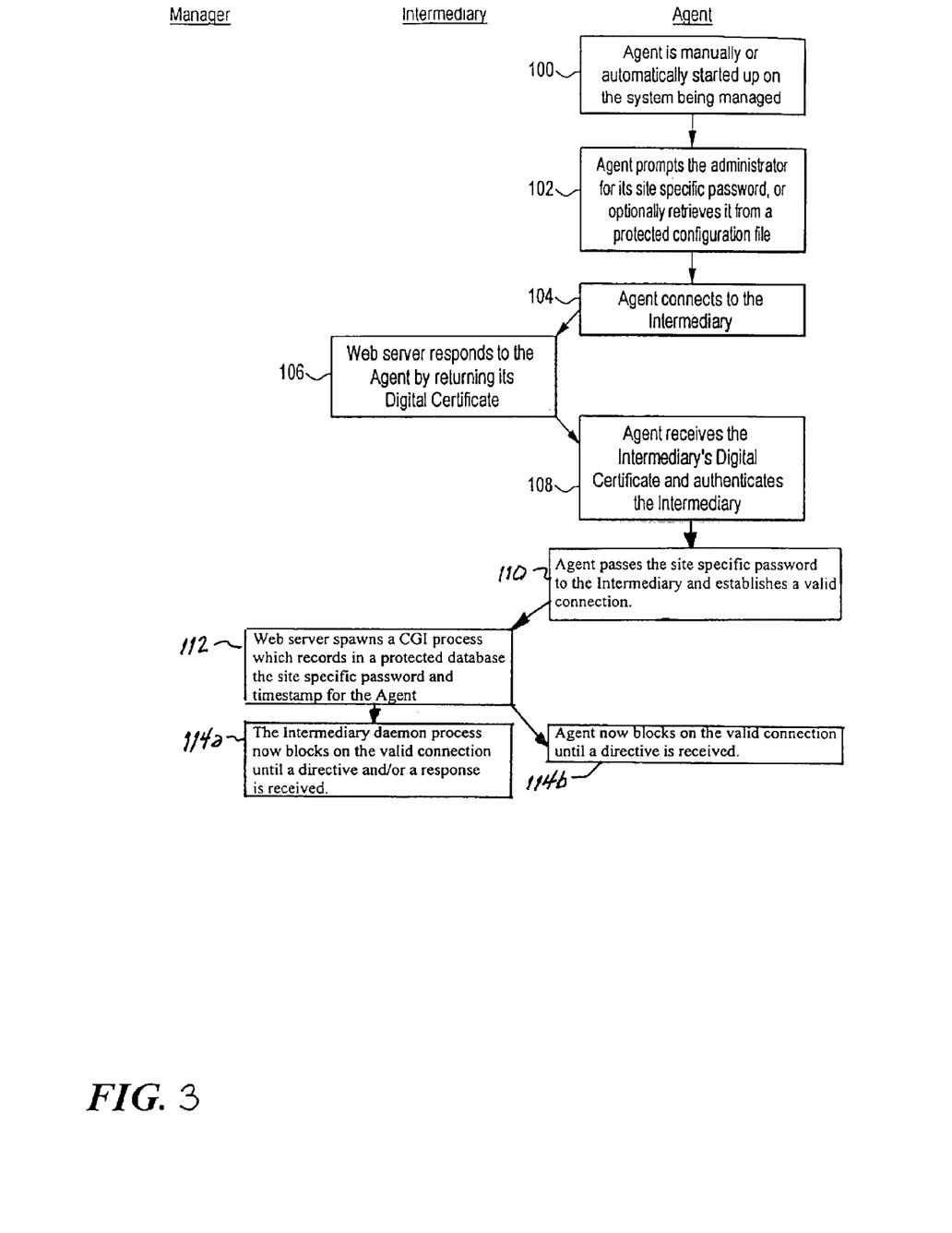
FIG. 3 is a flow diagram illustrating the establishment of secure communications between a secure service agent running on a computer system to be serviced and a secure service intermediary.

With reference to FIG. 3, the process by which the SSA 18 receives directives from the SSI 16 is illustrated. For purposes of this illustration, the SSA 18 may be referred to as "the Agent" and the SSI 16 may be referred to as "the Intermediary" or "the web server."

Depending upon the prior state of the system to be managed or serviced 14, the parent agent daemon process 44 of the Agent 18 is initiated (100), and authentication information is provided, either manually or by reference to a secure configuration file (102). Upon initial receipt of contact by the parent agent daemon process 44 (104), the parent intermediary daemon process 38 responds to the Agent 18 with a digital certificate (106). This enables the parent agent daemon process 44 to authenticate the Intermediary 16 (108).

Once authenticated, the Intermediary 16 receives a site-specific password from the Agent 18 (110). This password is stored in a secure or protected database in the Intermediary 16 (112) for later use in authenticating a user attempting to provide the Agent 18 with directives via the Intermediary 16. In one embodiment, the validity of the transferred password has a discrete lifetime. Thus, the password may be stored in the secure database of the Intermediary along with a time-stamp.

The parent intermediary daemon process 38 also spawns a child intermediary daemon process 40 in response to the establishment of a valid connection between the Intermediary 16 and the Agent 18. This child intermediary daemon process 40 will remain in existence as long as the valid connection exists between the Intermediary 16 and the Agent 18. Once spawned, the child intermediary daemon process 40, and the parent agent daemon process 44, block, receive or send (114a, 114b), depending upon whether a directive exists for transfer from the Intermediary 16 to the respective Agent 18 or whether directive results exist for transfer from the respective Agent 18 to the Manager 12 via the Intermediary 16.

Figure 4A:
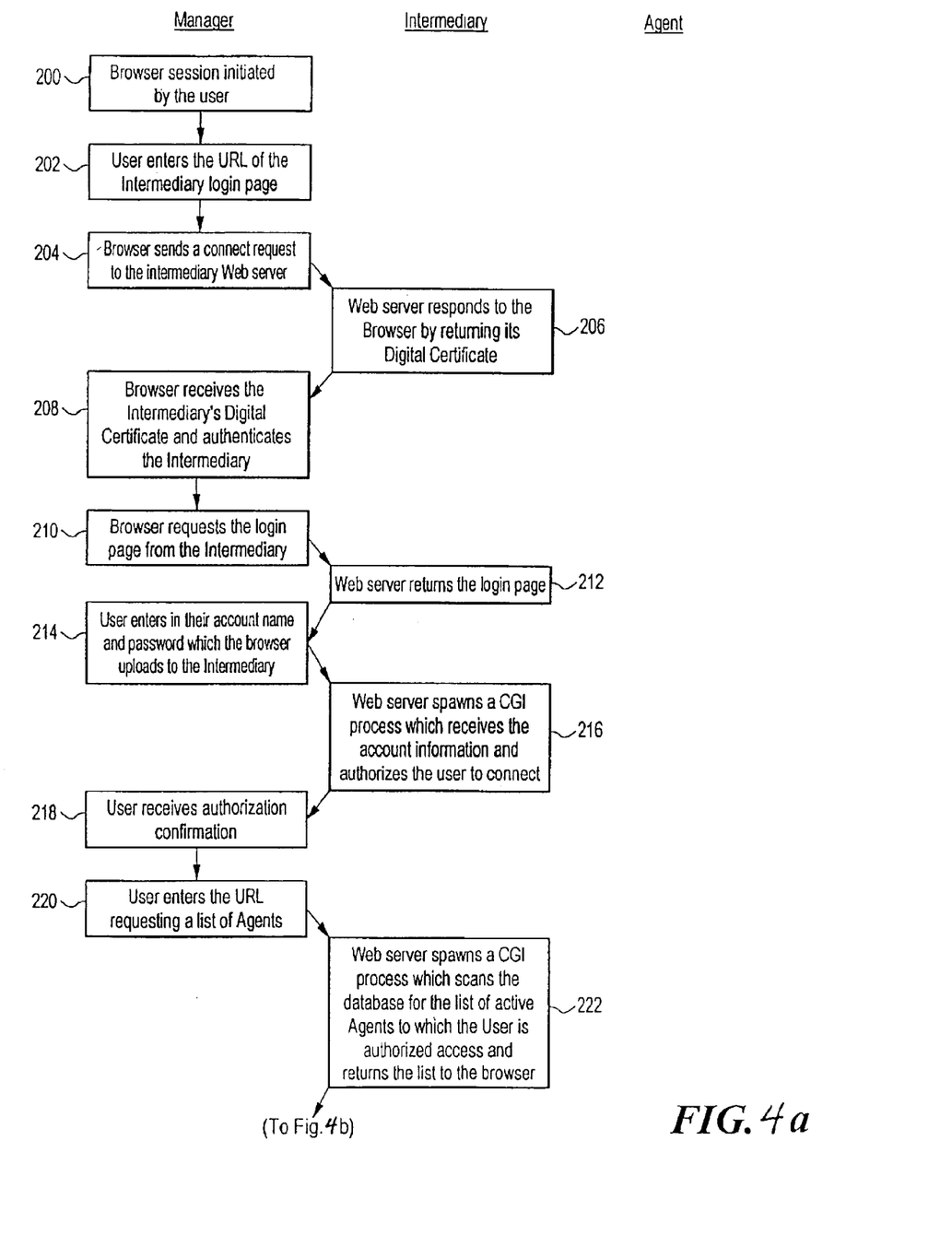
FIG. 4 is a flow diagram illustrating the establishment of secure communications between a remote service manager and a secure service intermediary, as well as the transmission of service directives from the service manager to the secure service agent via the secure service intermediary and the return of resulting data from the secure service agent to the service manager via the secure service intermediary.
Figure 4B:
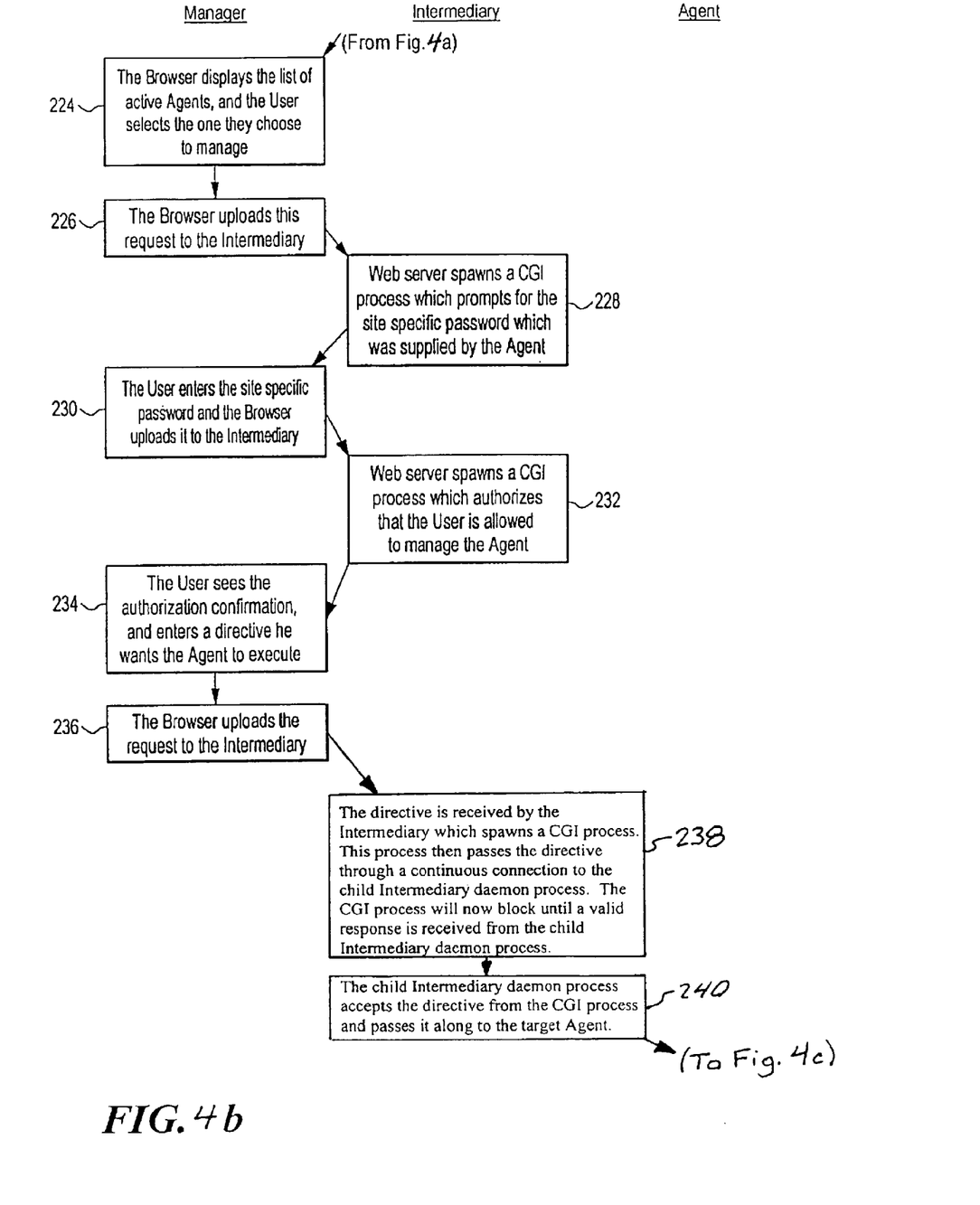
Figure 4C:
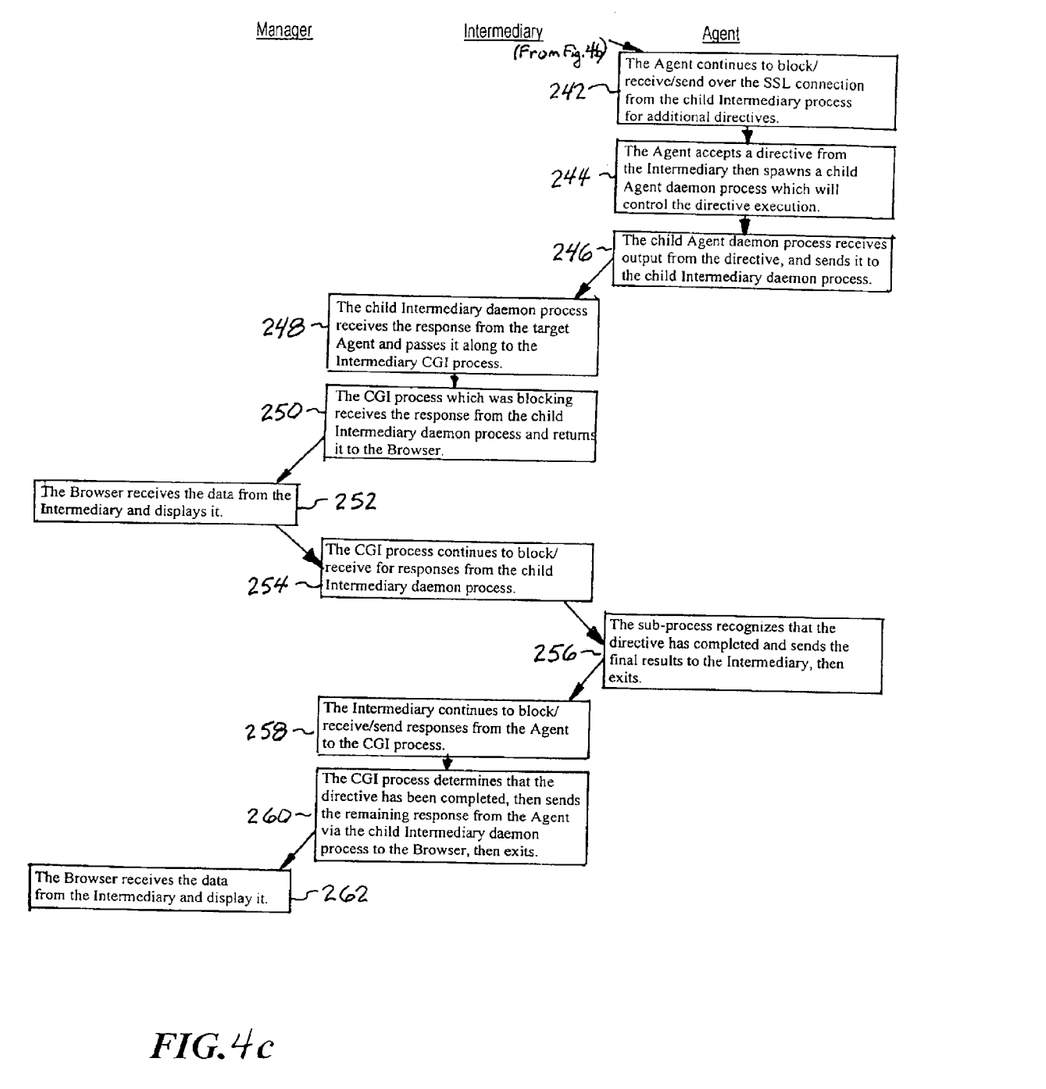

With reference to FIG. 4, one process by which a directive is defined by the Manager 12 and is responded to by the Agent 18 is illustrated. First, a service professional, referred to as a "user," opens a web browser 32 using the Manager 12 (200). Once the browser has been initiated, the user provides the browser with the URL of a login page in the Intermediary 16 web server 34 (202), resulting in the browser 32 sending a connect request to the web server 34 of the Intermediary 16 (204).

The web server 34 responds to the connect request by returning a digital certificate to the Manager 12 (206), which the Manager 12 uses to authenticate the Intermediary 16 (208). The web browser 32 spawns a CGI process in the Manager 12 for this purpose. If successful, the Manager 12 requests and receives a login page from the Intermediary 16 web server 34 (210, 212). The user provides his/her account name and password to the Intermediary 16 through this page and an associated CGI process (214), and the web server 34 spawns a CGI process for receiving this information and for authorizing the user via another Manager CGI process (216). Both the Manager 12 and Intermediary 16 have now been authenticated (218).

Next, the user enters a URL into the browser 32 which results in the Intermediary 16 spawning a CGI process which references an Intermediary 16 database (not illustrated) to establish which Agents 18 are active, and of those, which the user is authorized to access (220, 222). A list of user-accessible Agents 18 is provided to the Manager 12 browser 32 for user selection (222, 224), and the user's selection is uploaded to the Intermediary 16 via a CGI process (226).

In response to receipt of the Agent identifier, the Intermediary 16 web server 34 spawns a CGI process that requests from the user the site-specific password previously stored in the protected database of the Intermediary 16 (228, 110, 112). The user enters the password via the web browser 32 and another CGI process (230). Following Intermediary CGI authorization of the user based on the entered password (232), the web server 32 spawns a CGI process for enabling the user to define directives for execution by the Agent (234).

In response to the authorization confirmation by the Intermediary 16, the user enters into the Manager browser 32 a directive that he/she wants to have executed by the Agent 18 (234). This directive request is then uploaded to the Intermediary web server 34 (236), which spawns a CGI process 36 (238) for confirming that a valid SSL connection between the child intermediary daemon process 40 and the parent agent daemon process 44 has been established. If such a valid connection exists, the CGI process 36 passes the directive over a local SSL connection to the child intermediary daemon process 40. The CGI process 36 then begins blocking (238) on the local connection until a valid response is received from the child intermediary daemon process 40. This child intermediary daemon process meanwhile receives the directive and forwards it to the parent agent daemon process 44 (240) associated with the target system to be serviced 14.

Meanwhile, as indicated at the end of FIG. 3, the parent agent daemon process 44 has been blocking over the SSL with the Intermediary 16 while waiting to receive directives (114, 242). The Agent 18 is capable of handling plural directives simultaneously because it spawns a respective child agent daemon process 46 for controlling each directive to be executed on a respective target system 14 (244). The same child agent daemon process 46 blocks until results from the executed directive are received from the respective target system 14 (246). All responses from executed directives are returned to the Intermediary 16 over the same SSL connection via communication from the child agent daemon process 46 to the parent agent daemon process 44 to the child intermediary daemon process 44 (246).

The intermediary CGI process 36, which had been blocking, receives the response from the parent agent daemon process 44 via the child intermediary daemon process 40 (248) and sends it via standard HTTP to the Manager web browser 32 (250) for display at the user's computer 12 (252). The same CGI process 36 continues to block/receive/send, waiting for further results from the executed directive previously conveyed to the Agent 18 (254). Once the child agent daemon process 46 determines that the directive has been executed by the target system 14 and all responses from this directive have been passed back to the Intermediary 16, the child agent daemon process 46 exits (256). Meanwhile, the parent agent daemon process 44 continues to block (242) while waiting to receive further directives which would again cause the parent agent daemon process 44 to spawn further child agent daemon processes 46.

In the Intermediary 16, the child intermediary daemon process 40 and the CGI process 36 continue to block pending receipt of further results from the previously transferred directive (258). Once the child intermediary daemon process 40 and the CGI process 36 transfer the last results from the executed directive to the Manager browser 32, the CGI process exits while the child intermediary daemon process continues blocking pending receipt of a new directive to be conveyed to the respective parent agent daemon process 44 (260).

In the browser 32 of the Manager 12, the data from the Intermediary 16 is received and displayed to the user (262). The user then has the option of submitting one or more subsequent directives to the Intermediary for execution by the selected Agent (234).

As noted, the term "directive" can be interpreted as a single command, a string of diagnostic commands, or a command to replace an existing set of executable code with a new set. Other interpretations are also possible.

What is claimed is:

1. A remote access system for a secure computer network, comprising:

an agent operative in conjunction with said secure computer network;

an intermediary operative in conjunction with a network entity distinct from said secure computer network; and a manager for defining a directive to be executed by said agent, wherein said manager and said intermediary are capable of establishing secure communications therebetween, said intermediary and said agent are capable of establishing secure communications therebetween, said agent is operative to provide and said intermediary is operative to receive agent-specific authenticating data, said intermediary is operative to receive agent-specific authenticating data from said manager and to compare said agent-specific authenticating data from said manager with said agent-specific authenticating data from said agent, and said manager is operative to convey said directive to be executed to said intermediary and said agent is operative to receive said directive to be executed from said intermediary if said comparison by said intermediary of said agent-specific authenticating data provided by said agent and said agent-authenticating data provided by said manager yields a predetermined result.

2. The system of claim 1, wherein said agent is operative to execute said directive and to return results of said executed directive to said intermediary.

3. The system of claim 2, wherein said intermediary is operative to forward said results of said executed directive to said manager subsequent to said return of said results to said intermediary by said agent.

4. The system of claim 1, wherein said agent is operative to block pending receipt of said directive to be executed from manager via said intermediary.

5. The system of claim 1, wherein said agent and said intermediary are capable of authenticating each other prior to establishing said secure communications therebetween.

6. The system of claim 1, wherein said manager and said intermediary are capable of authenticating each other prior to establishing said secure communications therebetween.

7. The system of claim 1, wherein said manager is a web browser and said intermediary is a web server.

8. The system of claim 1, further comprising a single data pathway between said agent and said intermediary for each data pathway between said manager and said intermediary.

9. A method of remotely servicing a secure computer system, comprising:
 establishing a first secure communications pathway between a manager and an intermediary distinct from the secure computer system;
 establishing a second secure communications pathway between the intermediary and the secure computer system;
 providing authentication reference data from the secure computer system to the intermediary;
 providing authentication data from the manager to the intermediary;
 comparing the authentication data to the authentication reference data for a predetermined result; and
 if the predetermined result is realized, conveying a directive to be executed from the manager to the secure computer system via the intermediary over the first and second secure communications pathways.

10. The method of claim 9, further comprising establishing said first secure communications pathway by said manager conveying manager-identifying data to said intermediary.

11. The method of claim 9, further comprising establishing said second secure communications pathway by said agent conveying agent-identifying data to said intermediary.

12. The method of claim 9, further comprising establishing said second secure communications pathway by said intermediary conveying intermediary-identifying data to said agent.

13. The method of claim 9, wherein said establishment of said first secure communications pathway between said manager and said intermediary comprises using a web browser as said manager and accessing a web server as said intermediary.

14. The method of claim 9, further comprising:
 returning, by said agent, results of an executed directive to said intermediary; and
 returning, by said intermediary, said executed directive results to said manager.

15. A remote servicing system intermediary for a secure computer system, comprising:
 a web server communicable, over a first secure communications link, with a manager application running on a management computer system and, over a second secure communications link, with an agent application running on said secure computer system; and
 a secure data storage facility accessible by said web server, said web server operative
 to receive manager-identifying data from said agent application over said second secure communications link and to store said manager-identifying data in said secure data storage facility,
 to receive submitted manager-identifying data from said manager application over said first secure communications link,
 to compare said submitted manager-identifying data with said stored manager-identifying data, and, if said comparison yields a predetermined result,
 to spawn a first sub-process for receiving, over said first secure communications link, a directive to be executed by said secure computer system,
 to spawn a second sub-process for transmitting, over said second secure communications link, said directive to be executed by said secure computer system.

16. The intermediary of claim 15, further comprising a digital certificate to be conveyed to said agent application by said web server over said second secure communications link for enabling authentication of said intermediary.

17. The intermediary of claim 15, further comprising an access database in communication with said web server for defining which secure computer systems, communicable with said intermediary, said manager application may define directives for.

18. The intermediary of claim 15, wherein said web server is operative to receive results of an executed directive from said secure computer system over said second secure communications link and is further operative to convey said results to said manager application over said first secure communications link.

19. A method of operating an intermediary for the remote servicing of a secure computer system, comprising:
 providing a first digital certificate to an agent application running on said secure computer system in response to a request from said agent application for the purpose of authenticating said intermediary to said agent application;
 storing reference identifying information received from said agent application in a secure storage facility accessible by said intermediary;
 receiving first identifying information from said manager;
 selectively approving the accessibility of said intermediary to said manager by analysis of said first identifying information by said intermediary;
 receiving second identifying data from said manager;
 comparing, by said intermediary, said second identifying information with said reference identifying data; and
 if a predetermined result is achieved by said comparison, receiving, from said manager, a directive to be executed by said agent application and
 forwarding said directive to said agent application for execution.

20. The method of claim 19, further comprising:
 receiving results of said executed directive from said agent application at said intermediary; and
 forwarding said results to said manager by said intermediary.

21. The method of claim 19, further comprising:
 storing a list of secure computer systems, communicable with said intermediary, for which said manager, identified by said step of selectively approving, may define directives to be executed.

22. The method of claim 19, further comprising:
 establishing a first secure communications pathway between said intermediary and said agent application in response to said agent application authenticating said intermediary based upon said provision of said first digital certificate from said intermediary to said agent application.

23. The method of claim 19, further comprising:
 establishing a second secure communications pathway between said intermediary and said manager in response to said intermediary authenticating said manager based upon said provision of said first identifying data from said manager to said intermediary.

* * * * *

UNITED STATES PATENT AND TRADEMARK OFFICE
CERTIFICATE OF CORRECTION

| | |
|---|---|
| PATENT NO. | : 6,874,088 B1 |
| APPLICATION NO. | : 09/594654 |
| DATED | : March 29, 2005 |
| INVENTOR(S) | : Brian Stevens |

It is certified that error appears in the above-identified patent and that said Letters Patent is hereby corrected as shown below:

Column 2, line 28, "technology segment" should read - -technology which segment - -; and Column 6, line 7, "his" should read - -this- -.

Signed and Sealed this

Twenty-second Day of August, 2006

JON W. DUDAS
*Director of the United States Patent and Trademark Office*